US010631305B2

(12) United States Patent
Desai et al.

(10) Patent No.: US 10,631,305 B2
(45) Date of Patent: Apr. 21, 2020

(54) AUTOMATIC MULTI-CELL ENABLEMENT FOR COEXISTENCE WITH UNLICENSED INTERFERER WAVEFORMS

(71) Applicant: Cisco Technology, Inc., San Jose, CA (US)

(72) Inventors: Vishal S. Desai, San Jose, CA (US); Brian D. Hart, Sunnyvale, CA (US); David Kloper, Santa Clara, CA (US); Andrew Myles, Turramurra (AU)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 16/037,287

(22) Filed: Jul. 17, 2018

(65) Prior Publication Data
US 2020/0029361 A1 Jan. 23, 2020

(51) Int. Cl.
H04W 72/08 (2009.01)
H04W 72/12 (2009.01)
H04W 74/08 (2009.01)
H04W 72/04 (2009.01)
H04W 16/14 (2009.01)
(Continued)

(52) U.S. Cl.
CPC ......... H04W 72/082 (2013.01); H04W 16/14 (2013.01); H04W 16/18 (2013.01); H04W 16/32 (2013.01); H04W 24/04 (2013.01); H04W 72/044 (2013.01); H04W 72/0446 (2013.01); H04W 72/0453 (2013.01); H04W 72/0473 (2013.01); H04W 72/1215 (2013.01); H04W 72/1257 (2013.01); H04W 74/0808 (2013.01); H04W 84/12 (2013.01)

(58) Field of Classification Search
CPC .......... H04W 72/082; H04W 72/1215; H04W 72/1257; H04W 72/0473; H04W 72/0446; H04W 72/044; H04W 72/0453; H04W 24/04; H04W 16/32; H04W 16/18; H04W 16/14; H04W 74/0808; H04W 84/12
See application file for complete search history.

(56) References Cited

U.S. PATENT DOCUMENTS 6,980,810 B1 * 12/2005 Gerakoulis ........... H04W 92/02
342/386
9,350,483 B2 5/2016 Zhou et al.
(Continued)

OTHER PUBLICATIONS

Ioannis-Prodromos Belikaidis, et al., "Multi-Rat Dynamic Spectrum Access for 5G Heterogeneous Networks: The SPEED-5G Approach", IEEE Wireless Communications, Oct. 2017, 9 pages.
(Continued)

Primary Examiner — Joshua Kading
(74) Attorney, Agent, or Firm — Edell, Shapiro & Finnan, LLC

(57) ABSTRACT

In a wireless local area network (WLAN) that includes one or more wireless access points capable of serving one or more wireless clients, presence of one or more instances of interference from a particular type of interferer is detected on at least one channel in an unlicensed frequency band. In response to detecting the interference, a radio resource management process is biased to continue operation of at least one of the one or more access points, or individual radios of a multi-radio access point, on the channel to make at least some use of the channel for one or more wireless clients.

20 Claims, 4 Drawing Sheets

(51) Int. Cl.
    *H04W 16/18*    (2009.01)
    *H04W 16/32*    (2009.01)
    *H04W 24/04*    (2009.01)
    *H04W 84/12*    (2009.01)

(56) References Cited

U.S. PATENT DOCUMENTS

| | | |
|---|---|---|
| 9,473,179 B2 | 10/2016 | Mukherjee et al. |
| 9,532,243 B2 | 12/2016 | Kim et al. |
| 9,641,272 B2 | 5/2017 | Wang |
| 2011/0211548 A1* | 9/2011 | Russel .............. H04L 29/12207 370/329 |
| 2015/0063323 A1* | 3/2015 | Sadek ............... H04W 72/1215 370/336 |
| 2016/0037544 A1 | 2/2016 | Wang |
| 2016/0095110 A1 | 3/2016 | Li et al. |

OTHER PUBLICATIONS

"Qualcomm Research Lte in Unlicensed Spectrum: Harmonious Coexistence with Wi-Fi", Qualcomm Technologies, Inc., Jun. 2014, 19 pages.
Suzan Bayhan, et al., "The Future is Unlicensed: Coexistence in the Unlicensed Spectrum for 5G", arXiv:1801.04964v1, [cs.NI], Jan. 15, 2018, 7 pages.
Yemeserach Mekonnen, et al., "LTE and Wi-Fi Coexistence in Unlicensed Spectrum with Application to Smart Grid: A Review", arXiv:1708.09005v1, [cs.NI], Aug. 15, 2017, 5 pages.

\* cited by examiner

AUTOMATIC MULTI-CELL ENABLEMENT FOR COEXISTENCE WITH UNLICENSED INTERFERER WAVEFORMS

TECHNICAL FIELD

The present disclosure relates to wireless network communications.

BACKGROUND

The possible future proliferation of cellular technologies in unlicensed spectrum (such as New Radio-Unlicensed (NR-U), Licensed Assist Access (LAA), Long Term Evolution-Unlicensed (LTE-U), MulteFire and future systems not yet defined), which are collectively known as unlicensed LTE)) via deployments by carriers and enterprises across the United States and the rest of the world has the potential to disrupt Wi-Fi® wireless local area network (WLAN) systems using the same unlicensed frequency band channels. The disruption by unlicensed LTE could come from the use of high transmit power, high offered load and aggressive Listen-Before-Talk (LBT) operation, particularly in locations in which there are already operational Wi-Fi systems.

Radio resource mitigation techniques, which often move Wi-Fi systems by default into channels not containing unlicensed LTE systems, may be applied to maintain better Wi-Fi client connectivity and performance. However, automatically migrating Wi-Fi systems out of channels containing unlicensed LTE waveforms will allow unlicensed LTE to push Wi-Fi into a smaller and smaller number of channels. The end result will be that Wi-Fi systems will perform increasingly poorly and unlicensed LTE systems will have an opportunity to provide better service. Wi-Fi systems need to employ mechanisms that allow them to compete effectively for use of all unlicensed spectrum and thus maintain access parity with unlicensed LTE.

DESCRIPTION OF EXAMPLE EMBODIMENTS

Overview

Briefly, in a wireless local area network (WLAN) that includes one or more wireless access points capable of serving one or more wireless clients, presence of one or more instances of interference from a particular type of interferer is detected on at least one channel in an unlicensed frequency band. In response to detecting the interference, a radio resource management process is biased to continue operation of at least one of the one or more access points, or individual radios of a multi-radio access point, on the channel to make at least some use of the channel for one or more wireless clients.

Example Embodiments

Techniques are presented herein for use in wireless local area network (WLAN) environments that include one or more wireless access points (APs) capable of serving one or more wireless clients, and where waveforms from other systems/devices may be present. In particular, presence of one or more instances of a particular type of interferer is detected on at least one channel in an unlicensed frequency band. As described further herein, in response to detecting the particular type of interferer, a radio resource management process is biased to continue operation of at least one of the one or more access points, or individual radios of a multi-radio access point, on the channel to make at least some use of the channel for one or more wireless clients (at a cell edge) in the presence of the particular type of interferer. The radio resource management process may select a particular access point where interference from the particular type of interferer is present, in order to operate a WLAN cell to compete with the particular type of interferer. The radio resource management process may also determine how to allocate clients, and whether to advertise support for certain types of WLAN clients (e.g., IEEE 802.11ax clients, etc.), as described further below.

Figure 1:
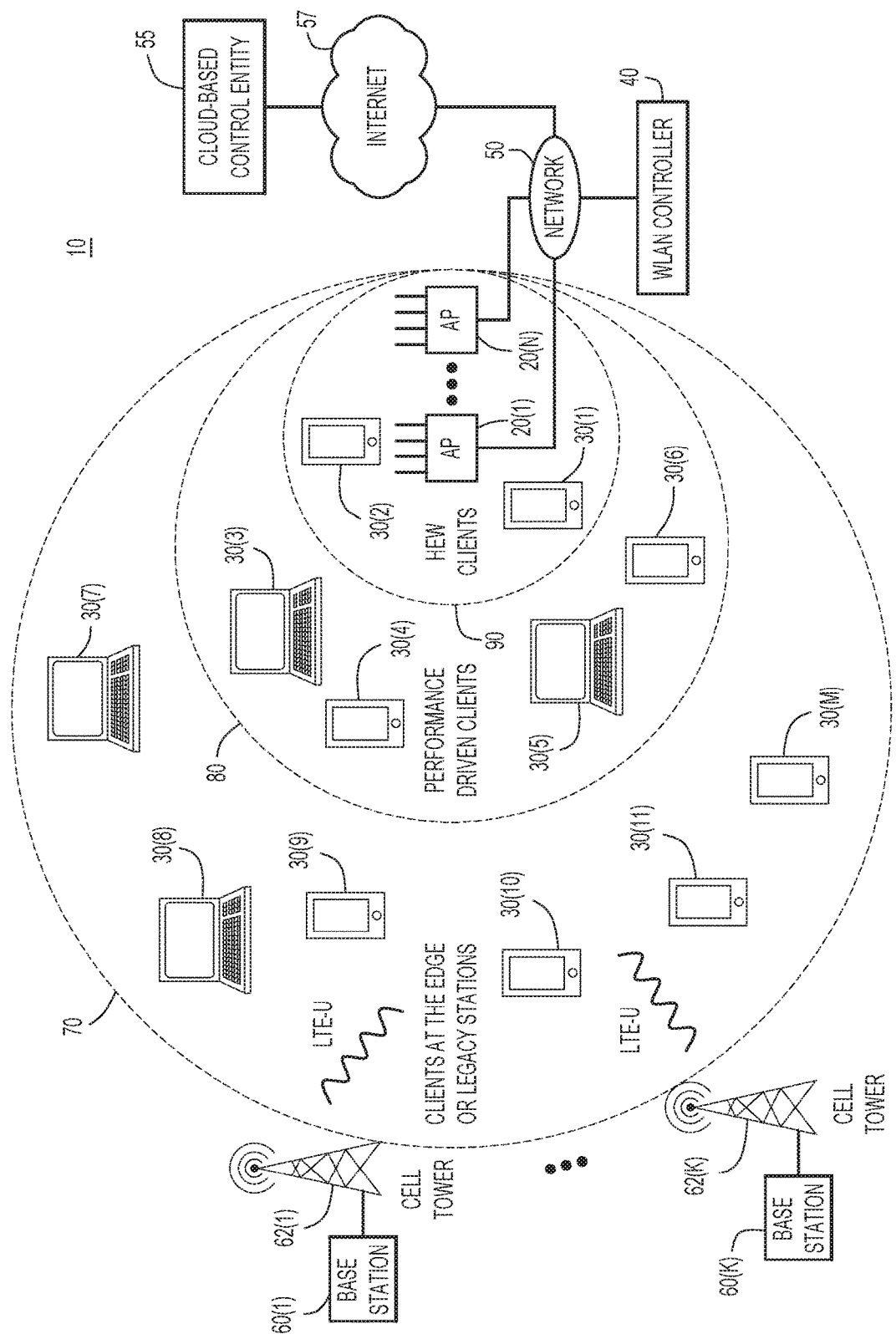
FIG. 1 is diagram depicting a wireless local area network (WLAN) environment in which techniques are provided for coexistence with interference of a particular type, according to an example embodiment.

Reference is now made to FIG. 1. FIG. 1 shows a WLAN environment 10 including a plurality of WLAN APs 20(1)-20(N) that serve a plurality of wireless client devices shown at 30(1)-30(M), in accordance with the Wi-Fi WLAN standard (IEEE 802.11). The APs 20(1)-20(N) are in communication with a WLAN controller 40 via a wired network 50. The functions of the WLAN controller 40 may be performed by a cloud-based control entity 55 that has connectivity to the APs via the Internet shown at 57. Moreover, some functions, such as radio resource management functions, may run within an AP, as will become more apparent from FIG. 2, described below.

In one example, the aforementioned particular type of interferer is a transmission from a wireless cellular network operating in the unlicensed frequency band made by one or more base stations 60(1)-60(K) via an associated tower 62(1)-62(K). The base stations 60(1)-60(K) may be co-located with a respective tower or separate from a respective tower. More specifically, in one example, the base stations 60(1)-60(K) may transmit, in the same unlicensed band used for by the WLAN, signals in accordance with the 4G/Long Term Evolution (LTE)-Unlicensed standard (LTE-U) to one or more wireless clients that also have wireless cellular network communication capabilities. The base station and associated tower may be configured for "public" use across a wider area of coverage, or may take a much more compact format configured for "private" use (a femtocell or picocell), such as the type deployed in a home where reception from wider area transmissions are weak. In general, however, the particular type of interferer may be any signal (transmission) from a system known to operate, or expected to operate, using carrier sense multiple access (CSMA) techniques or another medium access technique or some combination thereof, including finding a free channel (or set of relatively free hopping frequencies) in response to initial and/or ongoing channel scanning, optionally combined with some level of CSMA operation. As an example, and not by way of limitation, the particular type of interferer may have the following characteristics: potential for high duty cycle;

potential for wide and overlapping geographic coverage via high power or dense deployment or some combination thereof; and wide bandwidth (e.g. 20 MHz or more), that is impacting more than a predetermined (modest) percentage of WLAN channels in the unlicensed frequency band.

A "high" duty cycle may refer to a duty cycle that is above some arbitrary threshold, and the biasing operation described herein may be made to treat the duty cycle as being lower. For example, a simple linear scheme may be: bias=weight1*maxDutyCyle+weight2*meanDutyCyle+ weight3*expectedPercentageOverlapOfWiFiDeployment ServiceArea+ weight4*percentageOfWiFiChannelsAffected. In more complicated forms, the contribution of each term or sum of selected terms could be saturated.

A "wide" geographic coverage may refer to expected/ measuredPercentageOverlapOfWiFiDeploymentService-Area which is per Wi-Fi deployment service area, achieving coverage above −82 dBm over a 20 MHz channel. This could be "per indoor area in the neighborhood/city/country" or "per city" (indoor+outdoor) etc.

A mechanism is presented in which one or more of the APs automatically create a plurality of WLAN (e.g., 5 GHz) cells to compete with the particular type of interferer for usage of the unlicensed frequency band, while maintaining high Quality of Service (QoS) for its clients.

The plurality of WLAN cells include (1) a first type of cell called a Coverage Cell; a second type of cell called a Capacity Cell; and a (3) a third type of a cell called a Deterministic Cell. It should be understood that the plurality of WLAN cells may be an arbitrary number of cells that separate traffic for any number of reasons.

The Coverage Cell operates on one or more channels on which the particular type of interferer is detected and is served by the one or more access points that operate at a transmit power and a data rate that maximizes coverage for WLAN clients. The Coverage Cell, shown at reference numeral 70 in FIG. 1, is responsible to offer coverage for WLAN clients at the edge of the cell and at the same time compete with the particular type of interferer (e.g., unlicensed LTE waveform) for its fair share of the unlicensed spectrum. The Coverage Cell 70 is designed to offer maximum coverage for WLAN clients at the edge by enabling highest power and lowest data rates for maximum reach.

Furthermore, in Coverage Cell, the one or more APs that serve a Coverage Cell are controlled to configure one or more parameters including:
  receiver start-of-packet (RxSOP) threshold;
  transmit opportunity duration (TxOP);
  modulation/coding scheme (MCS);
  dynamic clear channel assessment (CCA) threshold;
  (aggressive) responsiveness to probe requests from wireless clients at cell edge;
  beamforming to selected wireless clients; and
  auto-tuning of Enhanced Distributed Channel Access (EDCA) parameters (Minimum Contention Window (CwMin), Maximum Contention Window (CwMax) and Arbitration Inter-frame Spacing (AIFS)) for contention back-off within allowed Channel Occupancy Time (COT) window.

With regard to the auto-tuning of EDCA parameters, the goal is to have aggressive CwMin, CwMax and AIFS in the Coverage Cell. The receiver start-of-packet (RxSOP) threshold may be adjusted to a level to increase spatial reuse at the expense of increased interference. An aggressive dynamic CCA threshold may be selected if an interference energy source is classified as the particular type of interferer. The CCA threshold may be changed per 20 MHz sub-channel based on impact by the particular type of interferer. The AP may be configured to be aggressive in responding to all Probe Requests. If the AP is capable of classifying capabilities of wireless client devices based on, for example, Dynamic Host Configuration Protocol (DHCP) characteristics, Application Visibility and Control (AVC) functionality, RF Fingerprinting of wireless client device transmissions, etc., then beamforming can be performed selectively to certain wireless client devices determined to be beamforming capable, for additional gain. Additionally, all radios in close vicinity of the particular type of interferer may auto-tune the Enhanced Distributed Channel Access (EDCA) parameters to offer aggressive contention back-off (within legal boundaries) within a maximum allowed Channel Occupancy Time (COT) window. Based on WLAN configurations and type of traffic, EDCA parameters can be dynamically fine-tuned to ensure fair coexistence between WLAN and the particular type of interferer (e.g., LTE-U) in the same spectrum.

The second type of cell, the Capacity Cell, is shown at reference numeral 80 in FIG. 1. The Capacity Cell 80 operates on a channel isolated from the one or more channels on which the particular interferer is detected. The Capacity Cell is dedicated to providing the best throughput for the associated clients in the serving AP's vicinity. The radio of the AP will migrate its operating frequency out of channels affected by the particular type of interferer (e.g., LTE-U) and it will conduct further optimizations in transmit cell size, data rate, clear channel assessment (CCA) etc., to offer best available capacity in a given radio frequency (RF) environment.

The third type of cell, the Deterministic Cell, shown at reference numeral 90 in FIG. 1, also operates on a channel isolated from the one or more channels on which the particular interferer is detected. The Deterministic Cell 90 is dedicated to serve one or more wireless clients that meet a criteria having a predetermined attribute. For example, the criteria may be a capability, a level of QoS, or priority/preference status of certain wireless clients. In one example, the criteria and predetermined attribute is that the one or more wireless clients support orthogonal frequency division multiple access (OFDMA) techniques. In this example, the Deterministic Cell 90 can provide consistent performance for IEEE 802.11ax clients, which support OFDMA. Similar to the Capacity Cell 80, the radios of APs serving a Deterministic Cell will also attempt to isolate its operational frequency to an isolated channel (possibly on Dynamic Frequency Selection (DFS) frequencies, which LTE-U tends not to use) to avoid any periodic interference from unlicensed LTE-U waveforms.

Furthermore, in the Deterministic Cell 90, the one or more APs serving a Deterministic Cell 90 may perform one or more operations to steer legacy wireless clients to either the first type of cell (Coverage Cell) or the second type of cell (Capacity Cell) so as to free up bandwidth in the third type of cell (Deterministic Cell) to serve wireless clients that meet the criteria having the predetermined attribute, e.g., support OFDMA techniques. This may be achieved by leveraging standardized steering mechanisms (IEEE 802.11k Assisted Roaming, IEEE 802.11v Basic Service Set (BSS) Transition Request, Probe Suppression, Association Denial or IEEE 802.11 De-authorization, etc.) to steer legacy (IEEE 802.11a, IEEE 802.11n and IEEE 802.11ac) wireless clients to either a Capacity Cell 80 or a Coverage Cell 70 based on the whether those clients operate within close proximity or at the cell edge. As the legacy clients are steered towards other cells, the AP/radio serving the Deterministic Cell can provide much more reliable performance (on throughput and latency) to its associated IEEE 802.11ax wireless clients via better Resource Unit (RU) selection and efficient time synchronization.

Figure 2:
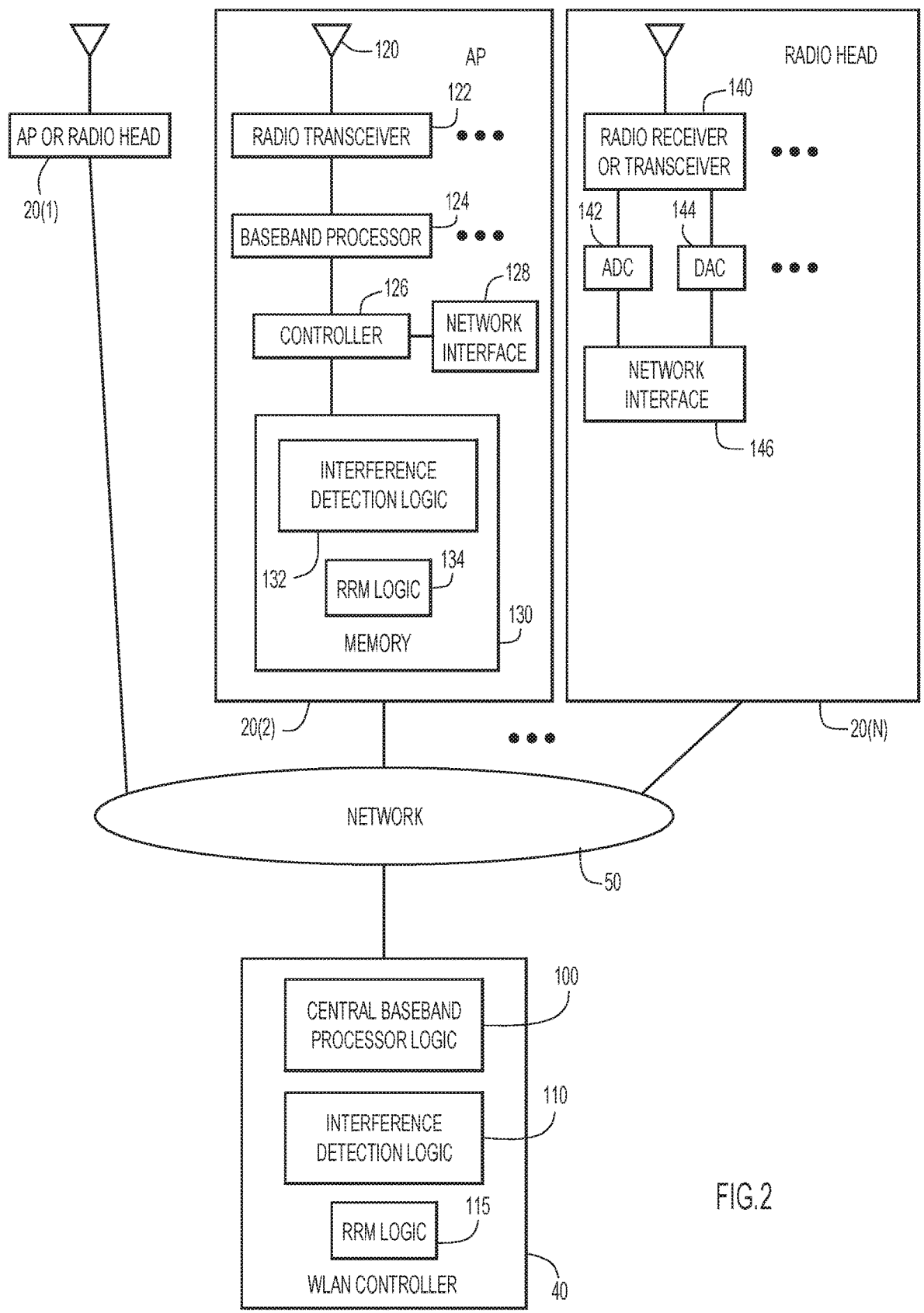
FIG. 2 is a block diagram showing various forms of WLAN access points configured to participate in the coexistence techniques, according to an example embodiment.

The following summarizes the 3 types of cells.
Coverage Cell
Increased Transmit Power
Reduced Modulation Coding Scheme
Aggressive EDCA
Dynamic CCA
Capacity Cell
Optimized for High Performance Clients
Optimized Transmit Cell Size
Fine-Tuned RxSOP
Deterministic Cell
Optimized for High-Efficiency Wireless (HEW)
802.11ax Specific Optimization
Improved Time Synchronization for Deterministic Performance FIG. 2 shows a block diagram depicting the APs 20(1)-20(N) in more detail. The plurality of APs 20(1)-20(N) may take on a variety of forms, including an AP or a radio head, as described in more detail below. The WLAN controller 40 is also connected to the wired network (e.g. a local area network) 50 so that it is in communication with the APs 20(1)-20(N). The WLAN controller (WLC) 40 may perform a variety of control functions for a WLAN and in general it is a computing apparatus or server configured with software to perform its various functions. In the case where one or more of the APs 20(1)-20(N) are radio head devices, then there is a central baseband processor entity 100. FIG. 2 shows that the functions of the central baseband processor logic 100 may be implemented by the WLAN controller 40, however, it should be understood that the central baseband processor logic 100 may be separate from the WLAN controller 40. The WLAN controller 40 may also be configured with interference detection logic 110 and radio resource management (RRM) logic 115 that, when executed by a processor of the WLAN controller 40, causes the WLAN controller to perform operations described herein.

FIG. 2 shows at reference numeral 20(2) an example in which an AP takes a stand-alone form and at reference numeral 20(N) an example in which an AP is a radio head device that cooperates with a central baseband processor. First, at 20(2), an AP may include antenna 120, a radio transceiver 122, a baseband processor (modem) 124, a controller (microprocessor or microcontroller) 126, a wired network interface 128, and memory 130 that stores instructions for RRM logic 132. The AP 20(2) may have multiple antennas and the radio transceiver 122 may have multiple transmitters and receivers, one for each antenna. The radio transceiver 122 performs downconverting to baseband of received radio frequency (RF) signals and upconverting to RF of baseband transmit signals. The baseband processor 124 performs baseband modulation to produce baseband transmit signals and baseband demodulation of received baseband receive signals. The baseband processor 124 may also perform various media access control (MAC) functions. The radio transceiver 122 and baseband processor 124 may be embodied as part of integrated circuit (IC) chipsets that are compliant with IEEE 802.11, for example. The term "radio" is used herein and is meant to refer to the combination of a radio transceiver 122 and associated modem 124. FIG. 2 shows that a given AP may have multiple radios, that is, multiple instances of pairs of a radio transceiver and associated modem to separately serve WLAN traffic in the same or different WLAN cells.

The controller 126 performs higher-level control of the AP 110(2) and to this end executes instructions for interference detection logic 132 and RRM logic 134 stored in memory 130 to perform operations described herein. The network interface 128 is a network interface card (NIC) that enables wired network communication via the network 50.

As shown in FIG. 2, an AP, e.g., AP 20(2), may have multiple instances of the radio transceiver 122 and baseband processor 124 so that the AP may serve two or more channels/cells simultaneously, which has certain advantages as described below.

A radio head, shown at 20(N), includes a radio receiver or radio transceiver 140 capable of transmission and reception of RF signals. An analog-to-digital converter (ADC) 142 is coupled to the radio receiver/transceiver 140 to convert analog receive signals to digital baseband receive signal data and a digital-to-analog converter (DAC) 144 is coupled to the radio receiver/transceiver 140 to convert digital baseband transmit data to analog signals for transmission by the radio receiver/transceiver 140 if the radio receiver/transceiver 140 has transmit capabilities. A network interface 146 is provided to enable network communications via network 50 to the central baseband processor logic 100. Like AP 20(2), the radio head 20(N) may have multiple instances of the radio transceiver 140 so that the radio head may serve two or more channels/cells simultaneously, which has advantages as described below.

The central baseband processor logic 100 performs the baseband receive processing (and baseband transmit processing) for radio heads, such as radio head 20(N). The radio head merely handles the RF receive (and RF transmit) functions.

At a high level, there are two primary operations performed according to the embodiments presented herein. The first is detecting presence of interference of a particular type, and the second operation is biasing a RRM process to continue operation of at least one of the one or more APs on the channel to make at least some use of the channel for one or more wireless clients in the presence of the particular type of interferer. In one form, both of these operations can be performed by an AP (or multiple APs) without the need for interaction or intervention from a WLAN controller (or cloud-based control entity). In another form, the first operation is performed by an AP (or multiple APs) and the second operation is performed by a WLAN controller (or cloud-based control entity) in response to output received from one or more APs performing the first operation, and the WLAN controller supplies controls back to one or more APs. In still another form, both the first operation and the second operation are performed by a WLAN controller (or cloud-based control entity) based on data (such as raw digital receive data, such as from a radio head or more processed data, such as from an AP) obtained from one or more APs.

Figure 3:
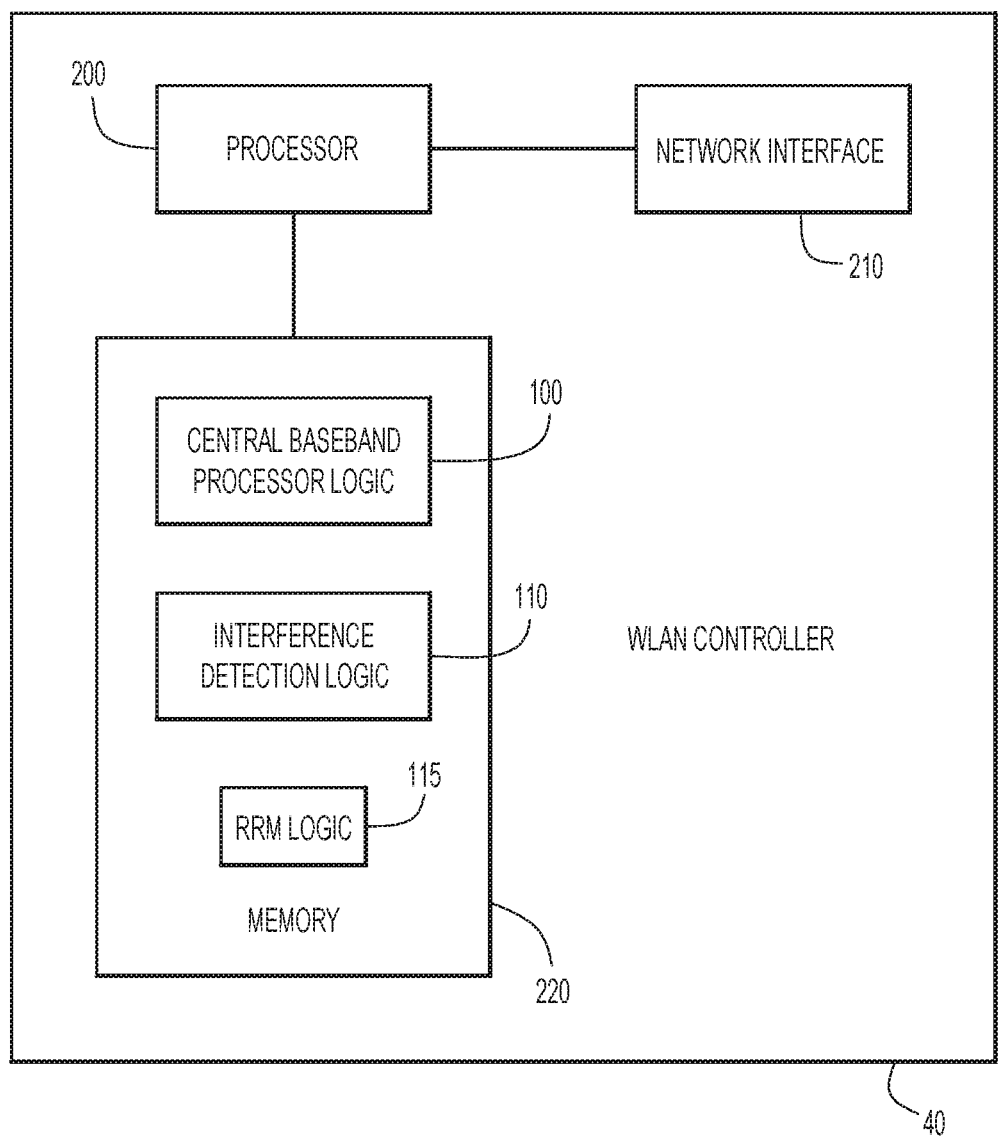
FIG. 3 is a block diagram of a WLAN controller apparatus configured to participate in the coexistence techniques, according to an example embodiment.

FIG. 3 shows a block diagram of the WLAN controller 40. The WLAN controller 40 includes one or more processors 200, a network interface 210 and memory 220 that stores instructions for central baseband processor logic 100, interference detection logic 110 and RRM logic 115. The processor(s) 200 may be one or more microprocessors or microcontrollers. The network interface 210 may be one or more network interface cards to enable network communications. The memory 220 may be read only memory (ROM), random access memory (RAM), magnetic disk storage media devices, optical storage media devices, flash memory devices, electrical, optical, or other physical/tangible memory storage devices. Thus, in general, the memory 220 may comprise one or more tangible (non-transitory) computer readable storage media (e.g., a memory device) encoded with software comprising computer executable instructions and when the software is executed (by the processor 200) it is operable to perform the operations described herein.

Figure 4:
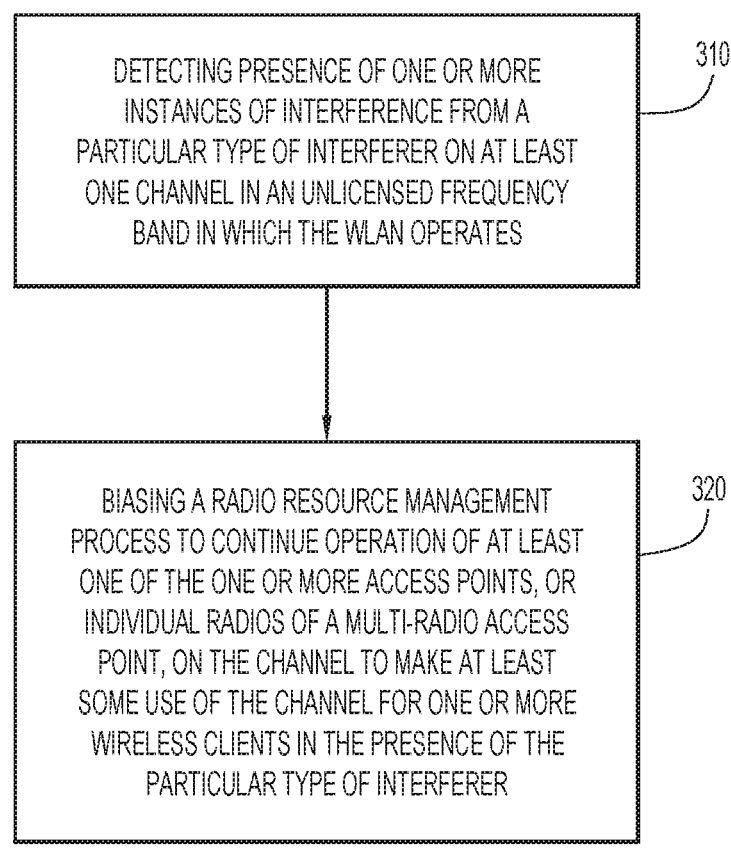
FIG. 4 is a high-level flow chart of operations of the coexistence techniques, according to an example embodiment.

Reference is now made to FIG. 4, with continued reference to FIGS. 1 and 2. FIG. 4 shows a flow chart for a method 300 according to an example embodiment. This method 300 may be performed by one or more APs 20(1)-20(N) or by collaboration between one or more APs and the WLAN controller 40. At 310, in a WLAN that includes one or more wireless APs capable of serving one or more wireless clients, a presence of one or more instances of interference from a particular type of interferer is detected on at least one channel in an unlicensed frequency band in which the WLAN operates. The detecting operation 310 may involve receiving energy in the channel in the unlicensed frequency band with a radio receiver of one or more of the APs and classifying transmissions and emitters of various types from the received energy, for example, based on duty cycle and other time-domain or frequency domain-characteristics of the received energy. There are numerous known techniques for detecting interference of signals of other various types in the unlicensed frequency band, and as such, details of such techniques are not described here.

The particular type of interferer may be a wireless cellular network transmission in the unlicensed frequency band. As explained above, the particular type of interferer may be a any signal (transmission) from a system known to operate, or expected to operate, using CSMA techniques or another medium access technique, including scanning a channel before using it for the longer term yet not performing carrier sense before making an individual transmission, and/or that has the aforementioned high duty cycle potential, wide coverage potential and dense deployment characteristics.

At 320, in response to detecting the particular type of interferer, a radio resource management process is biased to continue operation of at least one of the one or more APs, or individual radios of a multi-radio AP, on the channel to make at least some use of the channel for one or more wireless clients (at a cell edge) in the presence of the particular type of interferer. The biasing operation 320 may be performed by one of: one of the one or more APs; a controller apparatus connected to the one or more access points (e.g., the WLAN controller), or a cloud-based control entity in communication with the one or more access points.

Biasing does not mean attacking, being predatory, or classifying the particular type of interferer as a jammer. If there is sufficient spectrum of good quality, then there is no need to interfere with particular type of interferer (e.g., LTE-U waveform) without cause. Rather, biasing means that, for example, it may be more likely to reuse that spectrum as would otherwise be the case for the level of interference, because it is expected that the particular type of interferer (LTE-U waveform) would apply some basic channel access rules (honor CSMA), and the WLAN APs would not always "jump" on the particular type of interferer.

As described above in connection with FIG. 1, the biasing operation 320 may involve operating one or more of the access points to create a plurality of WLAN cells to compete with the interference of the particular type of interferer for usage of the unlicensed frequency band.

A goal of implementing different WLAN cells is to compete for fair-share access in presence of interfering waveforms of the particular type (e.g., unlicensed LTE waveforms) while ensuring good performance at the existing wireless clients. This is a tradeoff between degraded performance/QoS in general from insufficient spectrum for good Wi-Fi channel reuse, or degraded performance for some clients with increased interference. Based on AP hardware capabilities, two (or more) cells can be created by a single AP considering RF conditions around the AP and its associated and probing client capabilities. When the majority of the client base is IEEE 802.11ax in a specific area, a 2-radio AP at such location would create a Coverage Cell and a Deterministic Cells, while its neighboring (surrounding) 2-radio APs would offer a Capacity Cell for non-IEEE 802.11ax clients in the vicinity, plus an additional cell.

In terms of channelization, a goal is to have the Coverage Cell operating on the same frequency as the unlicensed interferer (e.g., unlicensed LTE) in order to compete for fair-share access while the Capacity and Deterministic cells would operate on isolated frequencies to avoid any performance impact. Frequency selection for these cells may be made by a centralized entity to avoid any unforeseen Overlapping Basic Service Set (OBSS) issues. Furthermore, due to non-contiguous Resource Unit (RU) transmit support and synchronized uplink (UL) coordination supported by IEEE 802.11ax stations, frequency assignment on the Deterministic Cell can be unconventional (more aggressive) than on the Capacity Cell. That is, based on the signal strength of interferers (including unlicensed LTE), a Deterministic Cell can operate on an overlapping spectrum when the interference is mainly affecting its secondary/extension channels. On the other hand, the Capacity Cell, which is primarily allocated to non-IEEE 802.11ax clients, would get assigned one or more "pristine" channel(s).

This solution is not targeted towards resolving a "dog fight" but it is rather directed to allowing a Wi-Fi WLAN to maintain access parity when a portion of the spectrum is shared with a particular type of interferer (e.g., unlicensed LTE). If a Wi-Fi WLAN vacates a channel, given the potentially higher throughput offered by unlicensed LTE (since no other systems are present, they operate a minimized LBT (Listen-Before-Talk) politeness, and they have LTE's robust HARQ scheme) and longer transmit times (TxOP), then the unlicensed LTE system would certainly have a throughput and QoS advantage over a Wi-Fi WLAN. This could create a positive feedback loop where the Wi-Fi WLAN limits itself to fewer channels (further reducing throughput and QoS compared to unlicensed LTE), gaining a reputation as being inferior to unlicensed LTE when the reality is that the Wi-Fi WLAN is just being more "polite". Ultimately, without employing the mechanisms presented herein, the Wi-Fi WLAN would otherwise give over sole control of the unlicensed spectrum. Furthermore, the mechanisms presented herein create a dynamic Coverage Cell only in the presence of the particular type of interferer (e.g., unlicensed LTE waveforms) when insufficient spectrum is available to meet the system needs. Thus, either in the absence of such a waveform or when signal is very weak or when sufficient unimpaired spectrum is available, an IEEE. 802.11ax AP would disable the Coverage Cell. Therefore, the AP will not have a negative effect on the particular type of interferer (e.g., LTE-U systems).

As explained above, frequency selection may be done via an entity (WLAN controller 40 or cloud-based control entity 55 shown in FIG. 1), which has a holistic view of the network and therefore, can select the best channel with consideration to OBSS issues and neighboring nodes. Alternatively, radio resource management in one AP may be performed for a group of collocated APs.

When the particular type of interferer is in the vicinity of the Wi-Fi WLAN, this mechanism is even more useful for optimal Wi-Fi WLAN connectivity. Although, in the example of FIG. 1, the Coverage Cell is shown to have larger cell size, the primary objective of such a cell is to maintain access parity with the particular type of interferer on the shared medium. With aggressive EDCA and dynamic CCA configurations, the Coverage Cell will ensure Wi-Fi radios are competing for their fair share when the particular type of interferer is in the vicinity, whether it be close or far.

Currently, when any type of interferer is operating within the vicinity of an WLAN AP, traditional radio resource management techniques try to isolate the Wi-Fi WLAN AP from such interference rather than deliberately putting it on the same channel. Unlike traditional Wi-Fi and non-Wi-Fi interferers, some interferers (e.g., unlicensed LTE) poses a very different and substantial threat to the fundamental existence of WLAN networks, and hence a solution is needed to address such an intricate problem.

While the foregoing describes the creation of 3 types of WLAN cells, it is not necessary that all 3 types of cells (Coverage, Capacity and Deterministic) be created and active at the same time. In some cases, different types of cells, but not necessarily all of the different types of cells, may be represented on all APs. Alternatively, there may be multiple APs supporting the multiple cells. Further still, a single 3-colocated radio AP may support two or more of the three types of cells.

In summary, a mechanism is provided that is responsive to the presence of unlicensed interferers of a particular type to bias a radio resource management process to continue operation of at least one of one or more APs on the channel where the interference is detected, to make at least some use of the channel for one or more wireless clients in the presence of the particular type of interferer. In one form, this may involve "biasing" of the radio resource management process may involve or result in automatically creating multiple Wi-Fi/WLAN cells. The Capacity Cell will provide good performance for wireless stations in close proximity and migrate them out of Wi-Fi frequencies shared with the unlicensed interferer of the particular type. The Deterministic Cell provides reliable performance for higher performance (e.g., IEEE 802.11 lax capable) wireless stations by isolating itself from legacy clients. A Coverage Cell, operating on the shared frequency(ies) where the interference is detected, offers service for wireless clients at the edge of the cell and most importantly it enforces fair sharing of the unlicensed channel(s) with the unlicensed interferer using RF optimizations specifically selected for the presence of the particular type of interferer.

In one form, a method is provided comprising: in a wireless local area network (WLAN) that includes one or more wireless access points capable of serving one or more wireless clients, detecting presence of one or more instances of interference from a particular type of interferer on at least one channel in an unlicensed frequency band; and in response to detecting the interference, biasing a radio resource management process to continue operation of at least one of the one or more access points, or individual radios of a multi-radio access point, on the channel to make at least some use of the channel for one or more wireless clients.

In another form, a system is provided comprising: one or more wireless local area network (WLAN) access points capable of serving one or more wireless clients, wherein the one or more access points are configured to detect presence of one or more instances of interference from a particular type of interferer on at least one channel in an unlicensed frequency band; and a controller apparatus in communication with the one or more access points, wherein the controller apparatus is configured to, in response to detection of the interference, biasing a radio resource management process to continue operation of at least one of the one or more access points, or individual radios of a multi-radio access point, on the channel to make at least some use of the channel for one or more wireless clients.

In still another form, an apparatus is provided comprising: a network interface configured to enable communication with one or more wireless local area network (WLAN) access points capable of serving one or more wireless clients, wherein the one or more access points are configured to detect presence of one or more instances of interference from a particular type of interferer on at least one channel in an unlicensed frequency band; and a processor coupled to the network interface, wherein the processor is configured to, in response to detection of the interference from the particular type of interferer, biasing a radio resource management process to continue operation of at least one of the one or more access points, or individual radios of a multi-radio access point, on the channel to make at least some use of the channel for one or more wireless clients.

In yet another form, one or more non-transitory computer readable storage media are provided, that are encoded with instructions which, when executed by a processor, cause the processor to: configure a network interface to enable communication with one or more wireless local area network (WLAN) access points capable of serving one or more wireless clients, wherein the one or more access points are configured to detect presence of one or more instances of interference from a particular type of interferer on at least one channel in an unlicensed frequency band; and in response to detection of the interference from the particular type of interferer, biasing a radio resource management process to continue operation of at least one of the one or more access points, or individual radios of a multi-radio access point, on the channel to make at least some use of the channel for one or more wireless clients.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
in a wireless local area network (WLAN) that includes one or more wireless access points capable of serving one or more wireless clients, detecting a presence of one or more instances of interference from a particular type of interferer on at least one channel in an unlicensed frequency band; and
in response to detecting the presence of the one or more instances of the interference, biasing a radio resource management process to continue operation of at least one of the one or more wireless access points on the at least one channel to make at least some use of the at least one channel for the one or more wireless clients by operating the at least one of the one or more wireless access points to create a plurality of WLAN cells to compete with the interference of the particular type of interferer for usage of the unlicensed frequency band, wherein the plurality of WLAN cells includes:
a first type of a WLAN cell that operates on the at least one channel and is served by the at least one of the one or more wireless access points, wherein the at least one of the one or more wireless access points operates at a first transmit power and a first data rate that maximizes coverage for the one or more wireless clients; and a second type of the WLAN cell that operates on a channel isolated from the at least one channel.

2. The method of claim 1, wherein the plurality of WLAN cells further includes:

a third type of the WLAN cell that operates on a channel isolated from the at least one channel;

wherein:

the second type of the WLAN cell is dedicated to providing a best available capacity based on a second transmit power, a second data rate and a clear channel assessment threshold; and the third type of the WLAN cell is dedicated to serve at least one wireless client of the one or more wireless clients that meets a criteria having a predetermined attribute.

3. The method of claim 2, further comprising, in the third type of the WLAN cell, the one or more wireless access points performing one or more operations to steer legacy wireless clients of the one or more wireless clients to either the first type of the WLAN cell or the second type of the WLAN cell so as to make available a bandwidth in the third type of the WLAN cell to serve the at least one wireless client of the one or more wireless clients that meets the criteria having the predetermined attribute.

4. The method of claim 1, wherein the at least one of the one or more wireless access points configure one or more parameters including:

a receiver start-of-packet threshold at a level to increase a receiver sensitivity or a noise figure.

5. The method of claim 1, wherein the particular type of interferer is a signal from a system known or expected to operate using a medium access technique including finding a free channel in response to initial and/or ongoing channel scanning.

6. The method of claim 5, wherein the interference from the particular type of interferer is a wireless cellular network transmission in the unlicensed frequency band.

7. The method of claim 1, wherein the biasing is performed by one of the one or more wireless access points or a controller apparatus connected to the one or more wireless access points.

8. The method of claim 1, wherein the at least one of the one or more wireless access points configure one or more parameters including:

a transmit power or a transmit opportunity duration.

9. The method of claim 1, wherein the at least one of the one or more wireless access points configure one or more parameters including:

a modulation coding scheme.

10. The method of claim 1, wherein the at least one of the one or more wireless access points configure one or more parameters including:

a dynamic clear channel assessment threshold.

11. The method of claim 1, wherein the at least one of the one or more wireless access points configure one or more parameters including:

a responsiveness to probe requests from the one or more wireless clients at an edge of the WLAN cell.

12. The method of claim 1, wherein the at least one of the one or more wireless access points configure one or more parameters including:

a selectiveness of beamforming to selected wireless clients of the one or more wireless clients.

13. The method of claim 1, wherein the at least one of the one or more wireless access points configure one or more parameters including:

enhanced distributed channel access parameters for a contention back-off within an allowed channel occupancy time window.

14. A system comprising:

one or more wireless local area network (WLAN) access points capable of serving one or more wireless clients, wherein the one or more WLAN access points are configured to detect a presence of one or more instances of interference from a particular type of interferer on at least one channel in an unlicensed frequency band; and a controller apparatus in communication with the one or more WLAN access points, wherein the controller apparatus is configured to, in response to detection of the presence of the one or more instances of the interference, bias a radio resource management process to continue operation of at least one of the one or more WLAN access points on the at least one channel to make at least some use of the at least one channel for the one or more wireless clients by operating the at least one of the one or more WLAN access points to create a plurality of WLAN cells to compete with the interference of the particular type of interferer for usage of the unlicensed frequency band, wherein the plurality of WLAN cells includes:

a first type of a WLAN cell that operates on the at least one channel and is served by the at least one of the one or more WLAN access points, wherein the at least one of the one or more WLAN access points operates at a first transmit power and a first data rate that maximizes coverage for the one or more wireless clients; and a second type of the WLAN cell that operates on a channel isolated from the at least one channel.

15. The system of claim 14, wherein the plurality of WLAN cells further includes:

a third type of the WLAN cell that operates on a channel isolated from the at least one channel;

wherein:

the second type of the WLAN cell is dedicated to providing a best available capacity based on a second transmit power, a second data rate and a clear channel assessment threshold; and the third type of the WLAN cell is dedicated to serve at least one wireless client of the one or more wireless clients that meets a criteria having a predetermined attribute.

16. The system of claim 15, wherein, in the third type of the WLAN cell, the one or more WLAN access points perform one or more operations to steer legacy wireless clients of the one or more wireless clients to either the first type of the WLAN cell or the second type of the WLAN cell so as to make available a bandwidth in the third type of the WLAN cell to serve the at least one wireless client of the one or more wireless clients that meets the criteria having the predetermined attribute.

17. The system of claim 14, wherein the at least one of the one or more WLAN access points configure one or more parameters including:

a receiver start-of-packet threshold at a level to increase receiver sensitivity or noise figure;
a transmit power;
a transmit opportunity duration;
a modulation coding scheme;
a dynamic clear channel assessment threshold;
a responsiveness to probe requests from the one or more wireless clients at an edge of the WLAN cell;
a selectiveness of beamforming to selected wireless clients of the one or more wireless clients; and
enhanced distributed channel access parameters for a contention back-off within an allowed channel occupancy time window.

18. The system of claim 14, wherein the particular type of interferer is a signal from a system known or expected to operate using a medium access technique including finding a free channel in response to initial and/or ongoing channel scanning.

19. An apparatus comprising:
a network interface configured to enable communication with one or more wireless local area network (WLAN) access points capable of serving one or more wireless clients, wherein the one or more WLAN access points are configured to detect a presence of one or more instances of interference from a particular type of interferer on at least one channel in an unlicensed frequency band; and
a processor coupled to the network interface, wherein the processor is configured to, in response to detection of the presence of the one or more instances of the interference, bias a radio resource management process to continue operation of at least one of the one or more WLAN access points on the at least one channel to make at least some use of the at least one channel for the one or more wireless clients by operating the at least one of the one or more WLAN access points to create a plurality of WLAN cells to compete with the interference of the particular type of interferer for usage of the unlicensed frequency band, wherein the plurality of WLAN cells includes:
a first type of a WLAN cell that operates on the at least one channel and is served by the at least one of the one or more WLAN access points, wherein the at least one of the one or more WLAN access points operates at a first transmit power and a first data rate that maximizes coverage for the at least one of the one or more wireless clients; and
a second type of the WLAN cell that operates on a channel isolated from the at least one channel.

20. The apparatus of claim 19, wherein the plurality of WLAN cells further includes:
a third type of the WLAN cell that operates on a channel isolated from the at least one channel;
wherein:
the second type of the WLAN cell is dedicated to providing a best available capacity based on a second transmit power, a second data rate and a clear channel assessment threshold; and
the third type of the WLAN cell is dedicated to serve at least one wireless client of the one or more wireless clients that meets a criteria having a predetermined attribute.

* * * * *